US009242644B2

(12) United States Patent
Hirasawa et al.

(10) Patent No.: US 9,242,644 B2
(45) Date of Patent: Jan. 26, 2016

(54) ELECTRICALLY-POWERED VEHICLE

(75) Inventors: Takahiko Hirasawa, Toyota (JP); Keiji Kaita, Miyoshi (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 148 days.

(21) Appl. No.: 14/118,130

(22) PCT Filed: May 16, 2011

(86) PCT No.: PCT/JP2011/061153
§ 371 (c)(1),
(2), (4) Date: Nov. 15, 2013

(87) PCT Pub. No.: WO2012/157054
PCT Pub. Date: Nov. 22, 2012

(65) Prior Publication Data
US 2014/0114523 A1   Apr. 24, 2014

(51) Int. Cl.
*B60W 20/00* (2006.01)
*B60K 6/445* (2007.10)
(Continued)

(52) U.S. Cl.
CPC ............ *B60W 20/40* (2013.01); *B60K 6/445* (2013.01); *B60L 3/00* (2013.01); *B60L 3/0015* (2013.01); *B60L 3/0092* (2013.01); *B60L 11/14* (2013.01); *B60L 11/1851* (2013.01); *B60L 11/1861* (2013.01); *B60W 10/08* (2013.01); *B60W 20/50* (2013.01); *B60L 2240/12* (2013.01); *B60L 2260/52* (2013.01); *Y02T 10/6239* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y10S 903/93* (2013.01)

(58) Field of Classification Search
None
See application file for complete search history.

(56) References Cited

U.S. PATENT DOCUMENTS

| 6,209,672 B1* | 4/2001 | Severinsky | 180/65.23 |
| 2009/0277704 A1 | 11/2009 | Yamaguchi | |
| 2010/0049389 A1* | 2/2010 | Ando | 701/22 |
| 2010/0292881 A1 | 11/2010 | Takahashi | |
| 2011/0046834 A1 | 2/2011 | Grider et al. | |
| 2011/0276213 A1 | 11/2011 | Tomatsuri | |

FOREIGN PATENT DOCUMENTS

| CN | 101557974 A | 10/2009 |
| DE | 10302504 A1 | 9/2004 |

(Continued)

OTHER PUBLICATIONS

International Search Report of PCT/JP2011/061153, dated Jul. 5, 2011.

*Primary Examiner* — John R Olszewski
*Assistant Examiner* — Gerrad A Foster
(74) *Attorney, Agent, or Firm* — Sughrue Mion, PLLC

(57) ABSTRACT

A hybrid vehicle illustrated as a representative example of an electrically-powered vehicle includes a chargeable/dischargeable power storage device, a motor configured to generate a vehicle drive force by receiving supply of power from the power storage device, an internal combustion engine as a drive force source, and a generator configured to generate charging power for the power storage device by power generation using an output of the internal combustion engine. If the generator cannot be operated normally, the control unit causes the electrically-powered vehicle to perform limp-home mode traveling by traveling using only the motor. During the limp-home mode traveling, the control device calculates a remaining travelable distance in the limp-home mode traveling, based on at least a remaining capacity of the power storage device and a vehicle speed.

5 Claims, 7 Drawing Sheets

(51) Int. Cl.
  *B60W 10/08* (2006.01)
  *B60L 3/00* (2006.01)
  *B60L 11/18* (2006.01)
  *B60L 11/14* (2006.01)

(56) References Cited

FOREIGN PATENT DOCUMENTS

| DE | 102007042351 A1 | 3/2009 |
|---|---|---|
| DE | 102009039092 A1 | 3/2011 |
| EP | 2028057 A2 | 2/2009 |
| JP | 9-119839 A | 5/1997 |
| JP | 2004-23857 A | 1/2004 |
| JP | 2004-254483 A | 9/2004 |
| JP | 2005-264910 A | 9/2005 |
| JP | 2006-19208 A | 1/2006 |
| JP | 2006-126107 A | 5/2006 |
| JP | 2006-320068 A | 11/2006 |
| JP | 2007-203883 | 8/2007 |
| JP | 2009-274566 A | 11/2009 |
| JP | 2010-264852 A | 11/2010 |
| WO | 2010082312 A1 | 7/2010 |

* cited by examiner

ELECTRICALLY-POWERED VEHICLE

CROSS REFERENCE TO RELATED APPLICATIONS

This application is a National Stage of International Application No. PCT/JP2011/061153 filed May 16, 2011, the contents of all of which are incorporated herein by reference in their entirety.

TECHNICAL FIELD

The present invention relates to an electrically-powered vehicle, and more particularly to control of an electrically-powered vehicle during limp-home mode traveling.

BACKGROUND ART

Conventionally, as an electrically-powered vehicle configured to be capable of generating a vehicle drive force using electric power from a vehicle-mounted power storage device, the one equipped with a vehicle state display device that determines a remaining travelable distance, which indicates how much farther the vehicle can travel, based on a remaining capacity (SOC: State of Charge) of the vehicle-mounted power storage device, and displays the remaining travelable distance on a display unit has been used. Further, a vehicle using an internal combustion engine as a motive power source also has a vehicle state display device that determines a remaining travelable distance based on a remaining amount of fuel, and displays the remaining travelable distance on a display unit.

As the vehicle state display device mounted in a vehicle using an internal combustion engine as a motive power source, for example, in Japanese Patent Laying-Open No. 2004-254483 (PTD 1), if deterioration in function occurs in a power supply system such as a battery and an alternator for supplying electric power to an EFI system having an injector injecting fuel to an internal combustion engine and electric components such as various sensors, and the like, a vehicle state display device displays a remaining travelable distance of a vehicle limited due to the deterioration in function on a display unit. In PTD 1, if deterioration in function occurs in the power supply system, firstly, a remaining capacity of the battery and a discharged current in that state are detected. Then, a remaining travelable time indicating how much longer the internal combustion engine can be driven continuously is calculated based on the detected remaining capacity of the battery and discharged current. Further, a remaining travelable distance is calculated based on the calculated remaining travelable time and an average vehicle speed of the vehicle.

CITATION LIST

Patent Document

PTD 1: Japanese Patent Laying-Open No. 2004-254483
PTD 2: Japanese Patent Laying-Open No. 2004-23857
PTD 3: Japanese Patent Laying-Open No. 2006-126107
PTD 4: Japanese Patent Laying-Open No. 2006-320068
PTD 5: Japanese Patent Laying-Open No. 2005-264910

SUMMARY OF INVENTION

Technical Problem

Here, some electrically-powered vehicles include a power generation mechanism for generating a vehicle drive force using electric power from a vehicle-mounted power storage device, and charging the vehicle-mounted power storage device during traveling of the vehicle. In such a hybrid-type electrically-powered vehicle, charging and discharging of the vehicle-mounted power storage device are repeatedly performed during traveling. On the other hand, if an abnormality occurs in the power generation mechanism, the vehicle-mounted power storage device cannot be charged during traveling of the vehicle. Thus, if the power generation mechanism has an abnormality, the electrically-powered vehicle performs limp-home mode traveling using only a motor within a range of performance determined by a remaining capacity of the vehicle-mounted power storage device. In order to ensure safety in the event of an abnormality, it is necessary to provide a mechanism which allows a driver to recognize a remaining travelable distance indicating how much farther the electrically-powered vehicle can travel by the limp-home mode traveling.

However, although PTD 1 discloses a configuration for displaying the remaining travelable distance when deterioration in function occurs in the power supply system mounted in the vehicle which travels using the internal combustion engine as a motive power source, PTD 1 does not disclose a configuration for displaying a remaining travelable distance when a vehicle-mounted power storage device cannot be charged in an electrically-powered vehicle which travels using electric power from the vehicle-mounted power storage device.

Further, in a configuration for determining a remaining travelable distance from a remaining capacity of a vehicle-mounted power storage device as in a conventional electrically-powered vehicle, the remaining capacity of the vehicle-mounted power storage device can be converted into the remaining travelable distance based on an average power consumption amount per unit traveling distance. However, since a drive force requested to the vehicle, a traveling resistance acting on the vehicle, and the like differ depending on a traveling state of the electrically-powered vehicle (for example, whether or not the vehicle is in an accelerated state) when an abnormality occurs in a power generation mechanism, there may arise a deviation between the remaining travelable distance calculated based on the remaining capacity and an actual remaining travelable distance.

Accordingly, the present invention has been made to solve such problems, and one object of the present invention is to accurately calculate, in an electrically-powered vehicle, a remaining travelable distance limited due to an abnormality in a power generation mechanism which charges a power storage device during traveling of the vehicle.

Solution to Problem

According to an aspect of the present invention, an electrically-powered vehicle includes a chargeable/dischargeable power storage device, a motor configured to generate a vehicle drive force by receiving supply of power from the power storage device, and a control unit controlling the vehicle drive force to be generated in response to a driver's request. The control unit includes a calculation unit calculating a remaining travelable distance in first traveling using stored power in the power storage device, based on at least a remaining capacity of the power storage device and a vehicle speed.

Preferably, the electrically-powered vehicle further includes an internal combustion engine as a drive force source, and a generator configured to generate charging power for the power storage device by power generation using an output of the internal combustion engine. The control unit is configured such that, if the generator cannot be operated normally, the control unit causes the electrically-powered vehicle to perform limp-home mode traveling by the first traveling using only the motor. During the limp-home mode traveling, the calculation unit calculates the remaining travelable distance in the first traveling, based on at least the remaining capacity of the power storage device and the vehicle speed.

Preferably, during the first traveling, the motor is driven to output the requested vehicle drive force to the electrically-powered vehicle. The calculation unit sets the remaining travelable distance in the first traveling calculated based on the remaining capacity of the power storage device and the vehicle speed at start of the first traveling, as an initial value, and updates the remaining travelable distance in the first traveling in accordance with the remaining capacity of the power storage device, the vehicle speed, and the requested drive force during the first traveling.

Preferably, the calculation unit corrects the remaining capacity of the power storage device at the start of the first traveling, by adding thereto a remaining capacity in accordance with the vehicle speed at the start of the first traveling, and calculates the initial value of the remaining travelable distance in the first traveling based on the corrected remaining capacity.

Preferably, during the first traveling, the calculation unit converts the remaining capacity of the power storage device during the first traveling into the remaining travelable distance in the first traveling, using a first conversion coefficient. The first conversion coefficient is set such that the remaining travelable distance with respect to the same remaining capacity of the power storage device has a value decreased with an increase in the vehicle speed or the requested drive force during the first traveling.

Preferably, the electrically-powered vehicle further includes an internal combustion engine as a drive force source, and a generator configured to generate charging power for the power storage device by power generation using an output of the internal combustion engine. The control unit is configured such that, if the motor cannot be operated normally, the control unit stops the motor and causes the electrically-powered vehicle to perform limp-home mode traveling by second traveling using only the internal combustion engine. During the second traveling, the internal combustion engine is driven to output the requested vehicle drive force to the electrically-powered vehicle. The calculation unit sets a remaining travelable distance in the second traveling calculated based on a remaining capacity of the power storage device and a vehicle speed at start of the second traveling, as an initial value, and updates the remaining travelable distance in the second traveling in accordance with the remaining capacity of the power storage device, the vehicle speed, and the requested drive force during the second traveling.

Preferably, the calculation unit corrects the remaining capacity of the power storage device at the start of the second traveling, by subtracting a remaining capacity in accordance with the vehicle speed at the start of the second traveling, from the remaining capacity of the power storage device at the start of the second traveling, and calculates the initial value of the remaining travelable distance in the second traveling based on the corrected remaining capacity.

Preferably, the calculation unit converts allowable charging power for the power storage device calculated based on the remaining capacity of the power storage device during the second traveling into the remaining travelable distance in the second traveling, using a second conversion coefficient. The second conversion coefficient is set such that the converted remaining travelable distance with respect to the same remaining capacity of the power storage device has a value decreased with an increase in the vehicle speed or the requested drive force during the second traveling.

Advantageous Effects of Invention

According to the present invention, in an electrically-powered vehicle, a remaining travelable distance limited due to an abnormality in a power generation mechanism which charges a power storage device during traveling of the vehicle can be accurately calculated.

DESCRIPTION OF EMBODIMENTS

Figure 1:
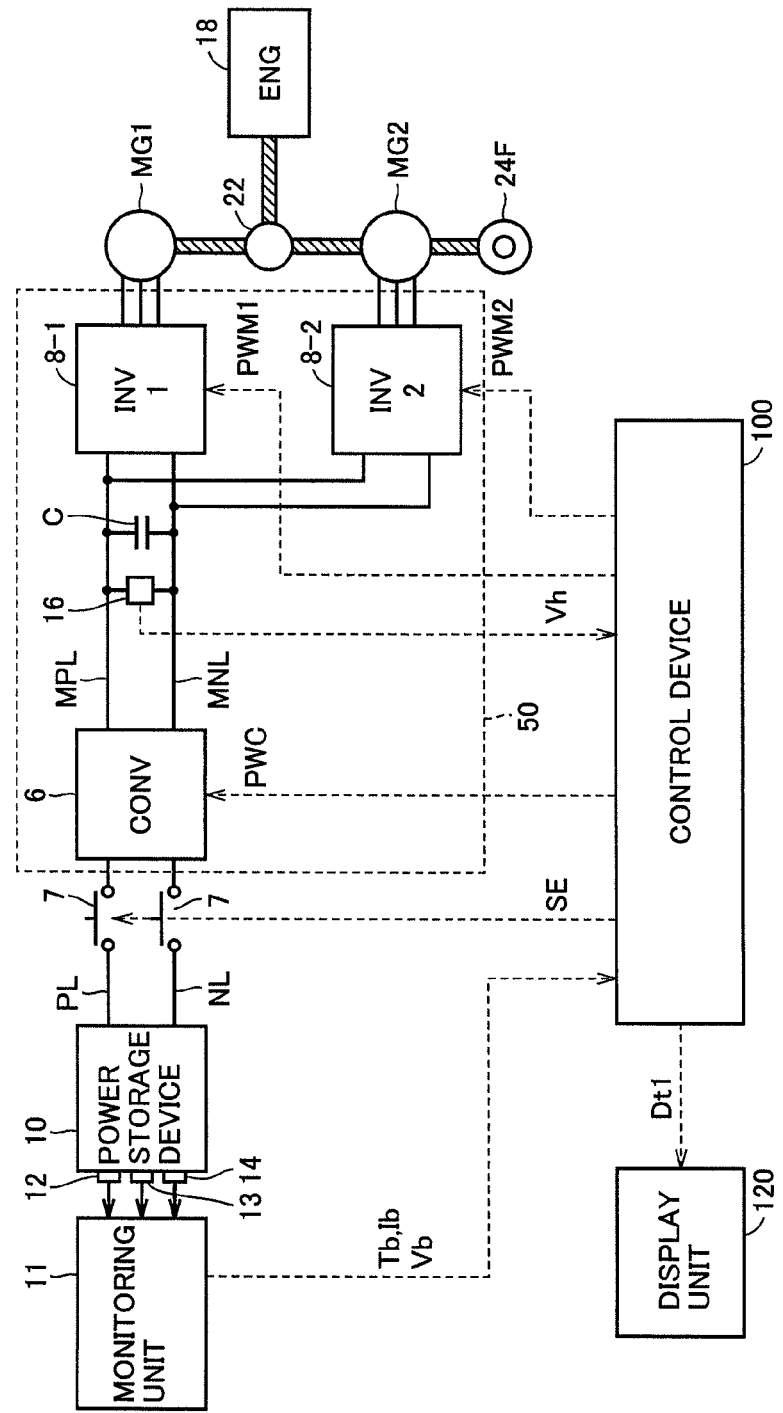
FIG. 1 is a schematic configuration diagram of a hybrid vehicle shown as a representative example of an electrically-powered vehicle in accordance with Embodiment 1 of the present invention.

Hereinafter, embodiments of the present invention will be described in detail with reference to the drawings, in which identical or corresponding parts will be designated by the same reference numerals.

Embodiment 1

FIG. 1 is a schematic configuration diagram of a hybrid vehicle 5 shown as a representative example of an electrically-powered vehicle in accordance with Embodiment 1 of the present invention.

Referring to FIG. 1, hybrid vehicle 5 is equipped with an engine (internal combustion engine) 18 and motor generators MG1, MG2. Hybrid vehicle 5 is further equipped with a power storage device 10 capable of inputting/outputting electric power to/from motor generators MG1, MG2.

Power storage device 10 is a redischargeable power storage element, and typically a secondary battery such as a lithium ion battery and a nickel hydride battery is applied. FIG. 1 shows a system configuration related to control of charging/discharging of power storage device 10 in hybrid vehicle 5.

A monitoring unit 11 detects a "state value" of power storage device 10, based on outputs of a temperature sensor 12, a voltage sensor 13, and a current sensor 14 provided in power storage device 10. Specifically, the "state value" includes at least a temperature Tb of power storage device 10, and further includes a voltage Vb and/or a current Ib of power storage device 10 as necessary. Since a secondary battery is typically used as power storage device 10 as described above, temperature Tb, voltage Vb, and current Ib of power storage device 10 will be hereinafter also referred to as a battery temperature Tb, a battery voltage Vb, and a battery current Ib, respectively. Further, battery temperature Tb, battery voltage Vb, and battery current Ib will also be referred to collectively as "battery data".

It is to be noted that temperature sensor 12, voltage sensor 13, and current sensor 14 collectively refer to temperature sensors, voltage sensors, and current sensors provided in power storage device 10, respectively. That is, it is noted for confirmation that, actually, a plurality of temperature sensors 12, voltage sensors 13, and/or current sensors 14 are generally provided.

Figure 2:
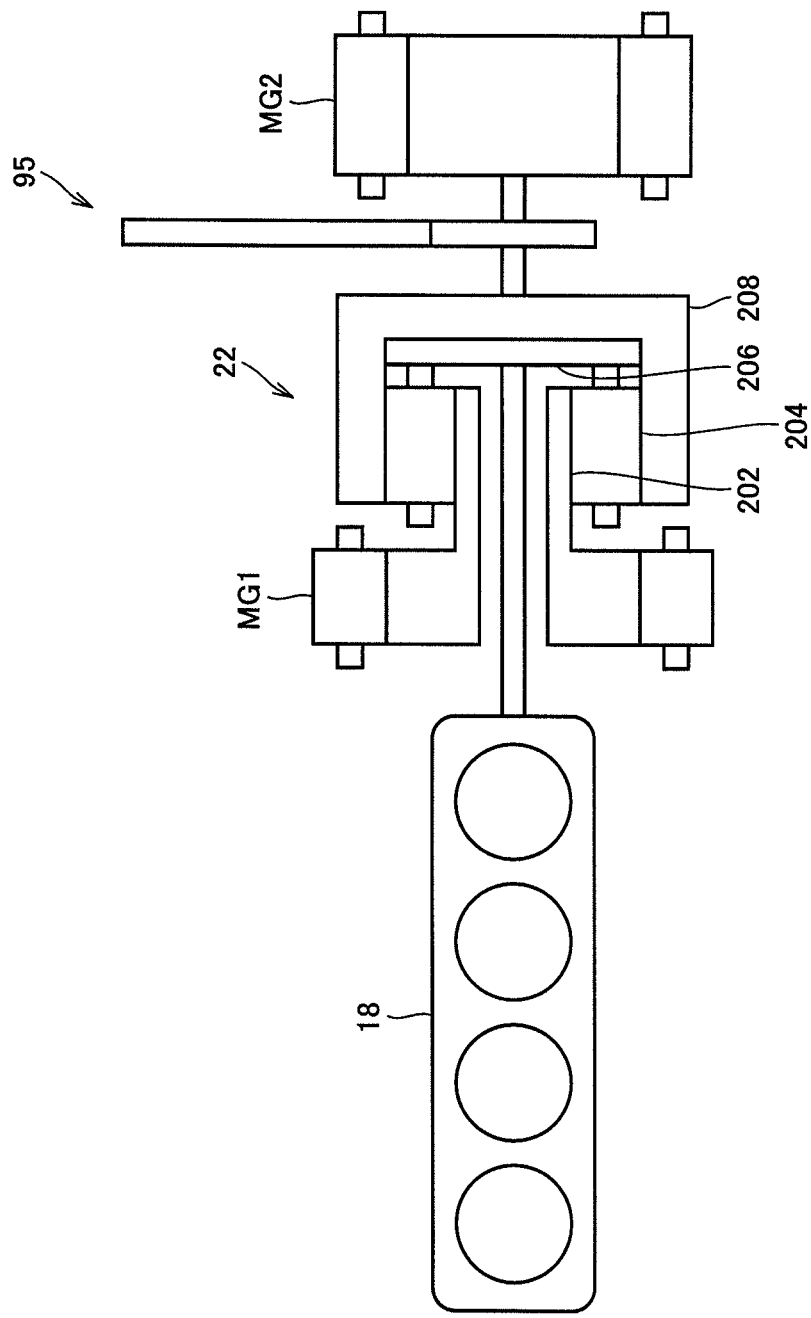
FIG. 2 is a configuration diagram of a motive power split mechanism shown in FIG. 1.

Engine 18, motor generator MG1, and motor generator MG2 are mechanically coupled via a motive power split mechanism 22. Referring to FIG. 2, motive power split mechanism 22 will be further described. Motive power split mechanism 22 is composed of a planetary gear including a sun gear 202, pinion gears 204, a carrier 206, and a ring gear 208.

Pinion gear 204 engages sun gear 202 and ring gear 208. Carrier 206 supports pinion gear 204 to be rotatable. Sun gear 202 is coupled to a rotation shaft of motor generator MG1. Carrier 206 is coupled to a crankshaft of engine 18. Ring gear 208 is coupled to a rotation shaft of motor generator MG2 and a reduction mechanism 95.

Figure 3:
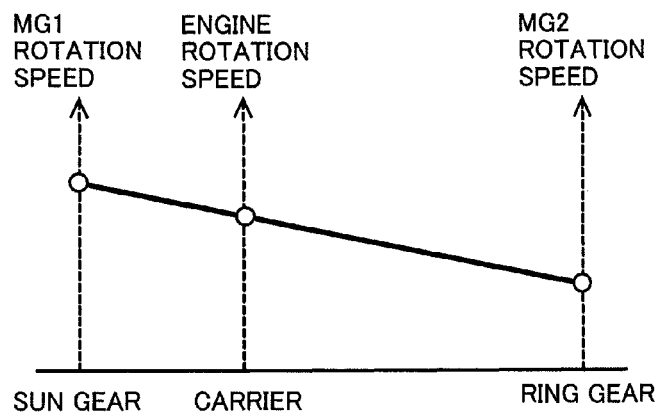
FIG. 3 is a nomograph of the motive power split mechanism.

Since engine 18, motor generator MG1, and motor generator MG2 are coupled via motive power split mechanism 22 composed of a planetary gear, rotation speeds of engine 18, motor generator MG1, and motor generator MG2 have the relation such that they are connected by a straight line in a nomograph, as shown in FIG. 3.

As a result, during traveling of hybrid vehicle 5, motive power split mechanism 22 splits a drive force generated by operating engine 18 into two, distributes one drive force toward motor generator MG1, and distributes the other drive force to motor generator MG2. The drive force distributed from motive power split mechanism 22 toward motor generator MG1 is used for an operation of generating electric power. On the other hand, the drive force distributed toward motor generator MG2 is combined with a drive force generated by motor generator MG2 and used to drive drive wheels 24F.

Thus, in accordance with a traveling situation of hybrid vehicle 5, a drive force is distributed and combined among the three components via motive power split mechanism 22, and consequently drive wheels 24F are driven. Further, during traveling of hybrid vehicle 5, power storage device 10 can be charged with electric power generated by motor generator MG1, using an output of engine 18 as a source. That is, engine 18 corresponds to an "internal combustion engine", and motor generator MG2 corresponds to a "motor". In addition, motor generator MG1 corresponds to a "power generation mechanism" and a "generator".

Referring to FIG. 1 again, hybrid vehicle 5 further includes a power control unit 50. Power control unit 50 is configured to perform bidirectional power conversion between motor generators MG1, MG2 and power storage device 10. Power control unit 50 includes a converter (CONV) 6, and a first inverter (INV1) 8-1 and a second inverter (INV2) 8-2 corresponding to motor generators MG1 and MG2, respectively.

Converter (CONV) 6 is configured to perform bidirectional direct current (DC) voltage conversion between power storage device 10 and a positive bus MPL which transfers a DC link voltage of each of inverters 8-1, 8-2. That is, an input/output voltage of power storage device 10 and a DC voltage between positive bus MPL and a negative bus MNL are boosted or bucked bidirectionally. Buck/Boost operations in converter 6 are respectively controlled in accordance with a switching command PWC from a control device 100. Further, a smoothing capacitor C is connected between positive bus MPL and negative bus MNL. A DC voltage Vh between positive bus MPL and negative bus MNL is sensed by a voltage sensor 16.

First inverter 8-1 and second inverter 8-2 perform bidirectional power conversion between DC power of positive bus MPL and negative bus MNL and alternating current (AC) power to be input to or output from motor generators MG1 and MG2. Mainly, in response to a switching command PWM1 from control device 100, first inverter 8-1 converts AC power generated by motor generator MG1 using the output of engine 18 into DC power, and supplies it to positive bus MPL and negative bus MNL. Thereby, even during traveling of the vehicle, power storage device 10 can be actively charged using the output of engine 18.

Further, when engine 18 is started, in response to switching command PWM1 from control device 100, first inverter 8-1 converts DC power from power storage device 10 into AC power, and supplies it to motor generator MG1. Thereby, engine 18 can be started using motor generator MG1 as a starter.

In response to a switching command PWM2 from control device 100, second inverter 8-2 converts DC power supplied through positive bus MPL and negative bus MNL into AC power, and supplies it to motor generator MG2. Thereby, motor generator MG2 generates a drive force for hybrid vehicle 5.

On the other hand, during regenerative braking of hybrid vehicle 5, motor generator MG2 generates AC power as drive wheels 24F decelerate. On this occasion, in response to switching command PWM2 from control device 100, second inverter 8-2 converts the AC power generated by motor generator MG2 into DC power, and supplies it to positive bus MPL and negative bus MNL. Thereby, power storage device 10 is charged during deceleration or during traveling on a downhill slope.

System main relays 7 inserted into and connected with a positive line PL and a negative line NL are provided between power storage device 10 and power control unit 50. System main relay 7 is turned on/off in response to a relay control signal SE from control device 100.

Control device 100 typically includes an electronic control unit (ECU) mainly composed of a CPU (Central Processing Unit), a memory region such as a RAM (Random Access Memory) and a ROM (Read Only Memory), and an input/output interface. Control device 100 performs control related to traveling of the vehicle and charging/discharging, by the CPU reading a program stored beforehand in the ROM or the like to the RAM and executing the same. It is to be noted that at least a portion of the ECU may be configured to perform predetermined numerical/logical computation processing using hardware such as an electronic circuit.

As examples of information to be input to control device 100, FIG. 1 illustrates the battery data (battery temperature Tb, battery voltage Vb, and battery current Ib) from monitoring unit 11, and DC voltage Vh from voltage sensor 16 arranged between lines of positive bus MPL and negative bus MNL. Although not shown, detected current values of phases of motor generators MG1, MG2 and detected rotation angle values of motor generators MG1, MG2 are also input to control device 100.

Hybrid vehicle 5 further includes a display unit 120. Display unit 120 is incorporated in an instrument panel unit, a car navigation system, or the like in front of a driver's seat, and is configured to be capable of displaying various types of information (character information and image information) for a driver to drive the vehicle. Display unit 120 can notify the driver of the various types of information in accordance with control by control device 100. That is, display unit 120 constitutes a "notification unit" in accordance with the present invention.

Further, in a case where an abnormality occurs in motor generator MG1 (corresponding to the power generation mechanism) and limp-home mode traveling is performed using motive power of motor generator MG2, display unit 120 displays a remaining travelable distance Dt1 indicating how much farther hybrid vehicle 5 can travel in the limp-home mode traveling, in accordance with the control by control device 100. Since this can allow the driver to recognize remaining travelable distance Dt1 in the limp-home mode traveling, this functions effectively for the driver to make a driving plan during the limp-home mode traveling.

It is noted for confirmation that, in the electrically-powered vehicle in accordance with Embodiment 1 of the present invention, display unit 120 is merely one form of the "notification unit" for notifying the driver of remaining travelable distance Dt1 in the limp-home mode traveling. That is, any notification method can be used as long as it allows the driver to recognize remaining travelable distance Dt1, and for example, the driver may be audibly notified of remaining travelable distance Dt1.

Figure 4:
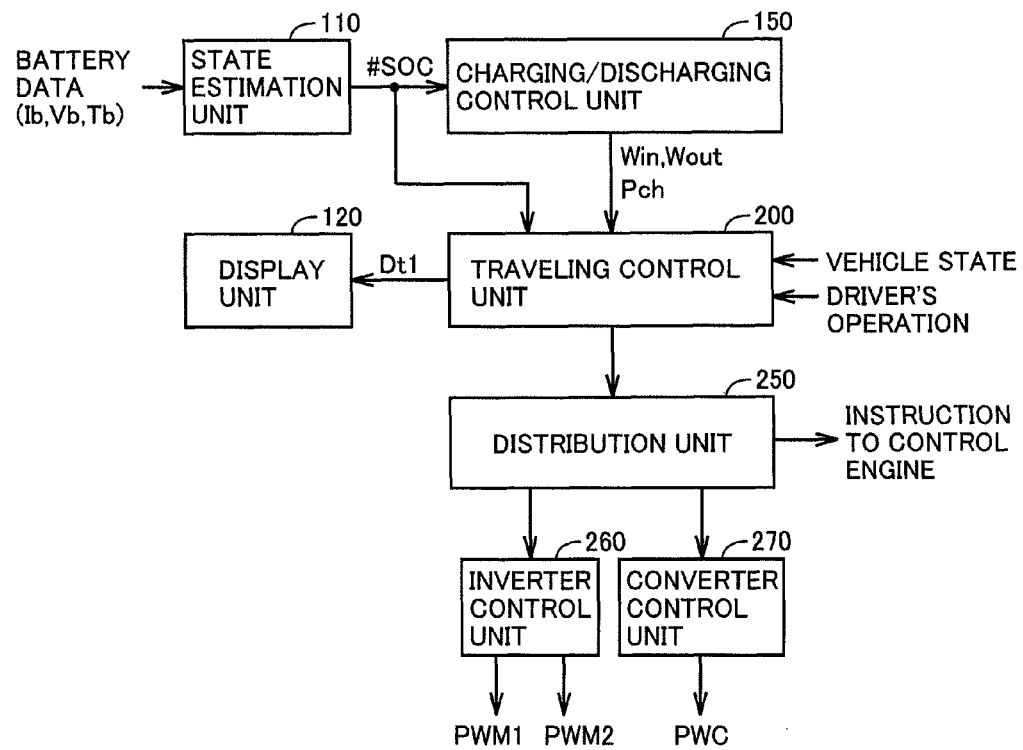
FIG. 4 is a functional block diagram illustrating traveling control in the electrically-powered vehicle in accordance with Embodiment 1 of the present invention.

FIG. 4 is a functional block diagram illustrating traveling control in the electrically-powered vehicle in accordance with Embodiment 1 of the present invention. Each functional block shown in FIG. 4 can be implemented by control device 100 executing software processing in accordance with a preset program. Alternatively, it is also possible to configure a circuit (hardware) having a function corresponding to the functional block inside control device 100.

Referring to FIG. 4, a state estimation unit 110 estimates the SOC of power storage device 10 based on the battery data (Ib, Vb, Tb) from monitoring unit 11. The SOC indicates a present remaining capacity relative to a fully-charged capacity in percentage (0 to 100%). For example, state estimation unit 110 sequentially computes an estimated SOC value (#SOC) of power storage device 10 based on an integrated value of a charged/discharged amount of power storage device 10. The integrated value of the charged/discharged amount is obtained by time-integrating the product of battery current Ib and battery voltage Vb (i.e., power). Alternatively, the estimated SOC value (#SOC) may be calculated based on the relation between an open circuit voltage (OCV) and the SOC. The estimated SOC value (#SOC) determined by state estimation unit 110 is transmitted to a charging/discharging control unit 150 and a traveling control unit 200.

Charging/discharging control unit 150 sets a charging power upper limit value Win and a discharging power upper limit value Wout based on the state of power storage device 10. Further, charging/discharging control unit 150 determines whether or not charging of power storage device 10 is required, and sets a charging power command value Pch for power storage device 10. If charging of power storage device 10 is not required, charging power command value Pch is set as Pch=0. On the other hand, if it is determined that charging of power storage device 10 is required, charging power command value Pch is set as Pch>0.

Traveling control unit 200 calculates a vehicle drive force and a vehicle brake force required for entire hybrid vehicle 5, in accordance with a vehicle state of hybrid vehicle 5 and the driver's operation. The driver's operation includes an amount of depression of an accelerator pedal (not shown), a position of a shift lever (not shown), an amount of depression of a brake pedal (not shown), and the like.

Then, traveling control unit 200 determines output requests to motor generators MG1, MG2 and an output request to engine 18 to achieve a requested vehicle drive force or vehicle brake force. Hybrid vehicle 5 can travel using only an output of motor generator MG2, with engine 18 being stopped. Therefore, energy efficiency can be improved by determining the output requests such that engine 18 is operated to avoid a region with poor fuel consumption. Further, the output requests to motor generators MG1, MG2 are set by limiting outputs such that charging/discharging of power storage device 10 is performed within a power range in which power storage device 10 can be charged/discharged (Win to Wout). That is, when it is not possible to ensure output power of power storage device 10, the output by motor generator MG2 is limited.

A distribution unit 250 computes torques and rotation speeds of motor generators MG1, MG2, in response to the output requests to motor generators MG1, MG2 set by traveling control unit 200. Then, distribution unit 250 outputs control commands for the torques and rotation speeds to an inverter control unit 260, and outputs a control command value for DC voltage Vh to a converter control unit 270.

On the other hand, distribution unit 250 generates an instruction to control the engine which indicates engine power and a target engine rotation speed determined by traveling control unit 200. In accordance with the instruction to control the engine, fuel injection, ignition timing, valve timing, and the like of engine 18 not shown are controlled.

Inverter control unit 260 generates switching commands PWM1 and PWM2 for driving motor generators MG1 and MG2, in response to the control commands from distribution unit 250. Switching commands PWM1 and PWM2 are output to inverters 8-1 and 8-2, respectively.

Converter control unit 270 generates switching command PWC such that DC voltage Vh is controlled in accordance with the control command from distribution unit 250. By voltage conversion of converter 6 in accordance with switching command PWC, charging/discharging power for power storage device 10 is controlled.

In this way, traveling control in hybrid vehicle 5 with improved energy efficiency is achieved in accordance with the vehicle state and the driver's operation. On the other hand, if an abnormality occurs in motor generator MG1 or first inverter 8-1 connected to motor generator MG1, motor generator MG1 cannot be used, and thus traveling using engine 18 as a motive power source cannot be performed. When motor generator MG1 has an abnormality as described above, hybrid vehicle 5 can stop operation of engine 18 and motor generator MG1, and perform limp-home mode traveling using the motive power generated by motor generator MG2.

During the limp-home mode traveling, traveling control unit 200 generates an instruction to inhibit operation of motor generator MG1, and outputs it to distribution unit 250. Upon receiving the instruction to inhibit operation of motor generator MG1 via distribution unit 250, inverter control unit 260 generates switching command PWM1 such that each of switching elements constituting first inverter 8-1 stops switching operation (all of them are turned OFF).

Further, traveling control unit 200 generates an instruction to operate motor generator MG2 and outputs it to distribution unit 250 for traveling using motor generator MG2 as a motive power source. Upon receiving the instruction to operate motor generator MG2 via distribution unit 250, inverter control unit 260 generates switching command PWM2 for converting DC power between positive bus MPL and negative bus MNL into AC power such that a motor current for each phase is supplied in accordance with a torque command value for motor generator MG2.

In this manner, in the limp-home mode traveling, motor generator MG1 does not perform the operation of generating electric power using motive power of engine 18, and charging of power storage device 10 by motor generator MG1 is limited. Accordingly, the SOC of power storage device 10 is inevitably reduced. As a result, when the SOC of power storage device 10 falls below a predetermined value, traveling control unit 200 stops operation of motor generator MG2 and terminates the limp-home mode traveling. That is, the remaining travelable distance in the limp-home mode traveling using only motor generator MG2 depends largely on the SOC of power storage device 10. In order to ensure safety of the vehicle in the event of an abnormality, it is necessary to accurately calculate the remaining travelable distance in the limp-home mode traveling and notify the driver of the calculated remaining travelable distance.

Hence, in hybrid vehicle 5 in accordance with Embodiment 1, if an abnormality occurs in motor generator MG1, traveling control unit 200 calculates remaining travelable distance D0 in the limp-home mode traveling using only motor generator MG2, based on the estimated SOC value (#SOC) from state estimation unit 110. Remaining travelable distance Dt1 indicates how much farther hybrid vehicle 5 can travel until the limp-home mode traveling is terminated by the estimated SOC value (#SOC) of power storage device 10 falling below the predetermined value. Traveling control unit 200 displays, on display unit 120, calculated remaining travelable distance D0 together with information about the abnormality in motor generator MG1, and thereby notifies the driver of remaining travelable distance Dt1. Since the driver can thereby make a driving plan based on remaining travelable distance Dt1, safety during the limp-home mode traveling can be improved.

(Calculation of the Remaining Travelable Distance in the Limp-Home Mode Traveling)

Hereinafter, a technique for calculating remaining travelable distance D0 in the limp-home mode traveling using motor generator MG2 in accordance with Embodiment 1 will be described with reference to the drawings.

During the limp-home mode traveling using motor generator MG2, motor generator MG2 generates the vehicle drive force using the electric power stored in power storage device 10. Therefore, remaining travelable distance Dt1 can be calculated by multiplying a traveling distance per unit amount of the SOC of power storage device 10 [km/%] by the SOC of power storage device 10. It is to be noted that the traveling distance per unit amount of the SOC [km/%] can be determined beforehand assuming that, for example, hybrid vehicle 5 performs motor traveling in a traveling pattern having a minimum electric consumption, which is a power consumption amount per unit traveling distance. When the traveling distance per unit amount of the SOC [km/%] is defined as a coefficient k1 [km/%] for converting the SOC of power storage device 10 into a traveling distance, remaining travelable distance Dt1 in the limp-home mode traveling is calculated by substituting the estimated SOC value (#SOC) of power storage device 10 at the start of the limp-home mode traveling into the following equation (1):

$$Dt1 = k1 \cdot \#SOC \tag{1}$$

Here, during traveling of the vehicle, hybrid vehicle 5 has kinetic energy in accordance with a vehicle speed. If a vehicle mass is represented by m and a vehicle speed is represented by V, the kinetic energy hybrid vehicle 5 has is represented by ½ mV². In a case where traveling against a traveling resistance by utilizing kinetic energy a vehicle has at that point in time (so-called inertia traveling) is performed, generally, the higher the kinetic energy is, the longer a travelable distance is. Accordingly, in a case where the vehicle speed at the start of the limp-home mode traveling is high, hybrid vehicle 5 has a higher kinetic energy than that in a case where the vehicle speed is low. Therefore, it is expected that, even if the same amount of electric power is stored in power storage device 10, hybrid vehicle 5 can travel for a longer distance in the former case. That is, even if the estimated SOC value (#SOC) of power storage device 10 at the start of the limp-home mode traveling is the same, remaining travelable distance Dt1 differs depending on the vehicle speed at the start of the limp-home mode traveling. As a result, there may arise a deviation between remaining travelable distance Dt1 calculated by the above equation (1) and an actual remaining travelable distance.

Thus, in Embodiment 1, traveling control unit 200 calculates remaining travelable distance Dt1 in the limp-home mode traveling, based on the estimated SOC value (#SOC) of power storage device 10 and vehicle speed V at the start of the limp-home mode traveling. Specifically, traveling control unit 200 corrects the estimated SOC value (#SOC) at the start of the limp-home mode traveling, by adding a remaining capacity ΔSOC in accordance with vehicle speed V at the start of the limp-home mode traveling to the estimated SOC value (#SOC) at the start of the limp-home mode traveling. That is, in expectation of kinetic energy hybrid vehicle 5 has at the start of the limp-home mode, traveling control unit 200 increases the estimated SOC value (#SOC) at the start of the limp-home mode traveling, by remaining capacity ΔSOC in accordance with the kinetic energy.

Here, correction amount ΔSOC for the estimated SOC value (#SOC) is calculated by multiplying vehicle speed V at the start of the limp-home mode traveling by a predetermined coefficient t [%/(km/h)]. Predetermined coefficient t is set, considering conversion efficiency when converting electrical energy into kinetic energy, and the like. As a result, the corrected estimated SOC value (#SOC) is represented by an equation (2):

$$\#SOC = \#SOC + t \cdot V \tag{2}$$

Traveling control unit 200 calculates remaining travelable distance Dt1 by substituting the corrected estimated SOC value (#SOC) into the above equation (1). Then, traveling control unit 200 controls display unit 120 to display calculated remaining travelable distance Dt1. Thereby, at the start of the limp-home mode traveling, the driver is notified of remaining travelable distance Dt1 calculated based on the corrected estimated SOC value (#SOC).

Further, traveling control unit 200 sets remaining travelable distance Dt1 at the start of the limp-home mode traveling as an initial value, and, while the limp-home mode traveling is performed, traveling control unit 200 updates remaining travelable distance Dt1 in accordance with a traveling state of hybrid vehicle 5.

Specifically, during the limp-home mode traveling, traveling control unit 200 monitors the estimated SOC value (#SOC) of power storage device 10, vehicle speed V, and an accelerator opening degree as the amount of depression of the accelerator pedal. Then, traveling control unit 200 calculates remaining travelable distance Dt1 at present based on the monitored estimated SOC value (#SOC), vehicle speed V, and accelerator opening degree.

Remaining travelable distance Dt1 at present is calculated by multiplying the estimated SOC value (#SOC) of power storage device 10 by a predetermined coefficient k2 [km/%]. Here, predetermined coefficient k2 is a coefficient for converting the SOC of power storage device 10 during the limp-home mode traveling into a traveling distance. Using coefficient k2, remaining travelable distance Dt1 in the limp-home mode traveling is calculated by the following equation (3):

$$Dt1 = k2 \cdot \#SOC \quad (3).$$

It is to be noted that #SOC in the equation (3) is the estimated SOC value (#SOC) corrected by the above equation (2). The corrected estimated SOC value (#SOC) is obtained by adding remaining capacity $\Delta SOC$ (=t·V) in accordance with vehicle speed V at the start of the limp-home mode traveling to the estimated SOC value (#SOC) given from state estimation unit 110 during the limp-home mode traveling.

Further, coefficient k2 in the equation (3) is variably set in accordance with vehicle speed V and the accelerator opening degree during the limp-home mode traveling. This is based on the finding that, when comparison is made between a case where hybrid vehicle 5 performs the limp-home mode traveling at a constant speed and a case where hybrid vehicle 5 performs the limp-home mode traveling while being accelerated, even if hybrid vehicle 5 travels the same distance, electric power output from power storage device 10 differs due to differences in the traveling resistance acting on the vehicle and the requested vehicle drive force.

Figure 5:
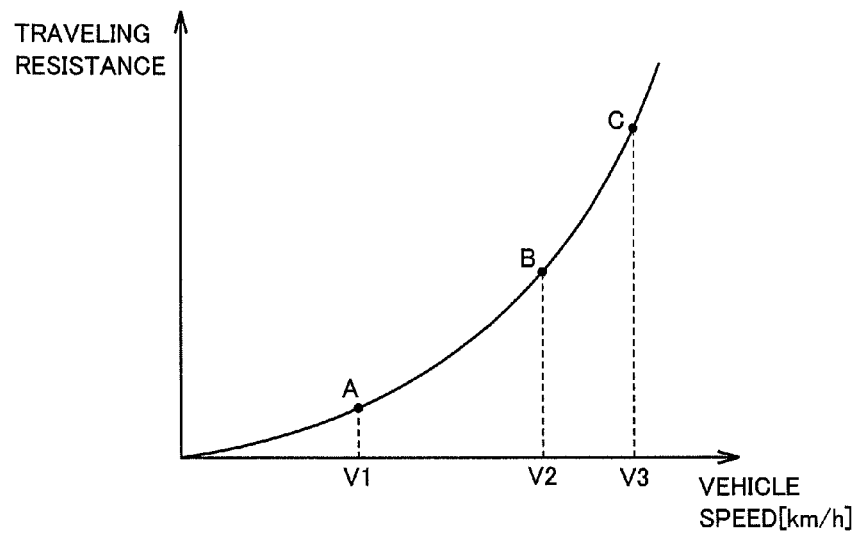
FIG. 5 is a conceptual diagram illustrating the relation between a vehicle speed and a traveling resistance.

FIG. 5 conceptually shows the relation between a vehicle speed and a traveling resistance. The traveling resistance refers to a resistance acting in a direction opposite to a moving direction of a vehicle when the vehicle travels, and includes, for example, air resistance, acceleration resistance, gradient resistance, rolling resistance of wheels, and friction resistance at a bearing portion provided in a vehicle when wheels are rotating. Among them, air resistance is proportional to the square of a vehicle speed.

As shown in FIG. 5, the traveling resistance increases with an increase in the vehicle speed. Accordingly, of a plurality of driving points A to C shown in the drawing having vehicle speeds different from one another, the traveling resistance is lowest at driving point A, and is highest at driving point C. Further, the kinetic energy the vehicle has is lowest at driving point A, and is highest at driving point C.

Here, it is assumed that, in a state where hybrid vehicle 5 is caused to perform the limp-home mode traveling at driving point A (vehicle speed: V1), hybrid vehicle 5 is accelerated to shift to driving point B (vehicle speed: V2). In such a case, the vehicle drive force necessary for entire hybrid vehicle 5 is calculated, considering the traveling resistance in addition to the accelerator opening degree. In order to realize acceleration in accordance with the accelerator opening degree while overcoming the traveling resistance, motor generator MG2 should generate a large drive force. Thus, more electric power is output from power storage device 10, when compared with a case where, for example, hybrid vehicle 5 is caused to perform constant speed traveling at driving point B. As a result, even if the estimated SOC value (#SOC) of power storage device 10 is the same, remaining travelable distance Dt1 is reduced because more electric power is consumed by motor generator MG2 during the limp-home mode traveling.

Figure 6:
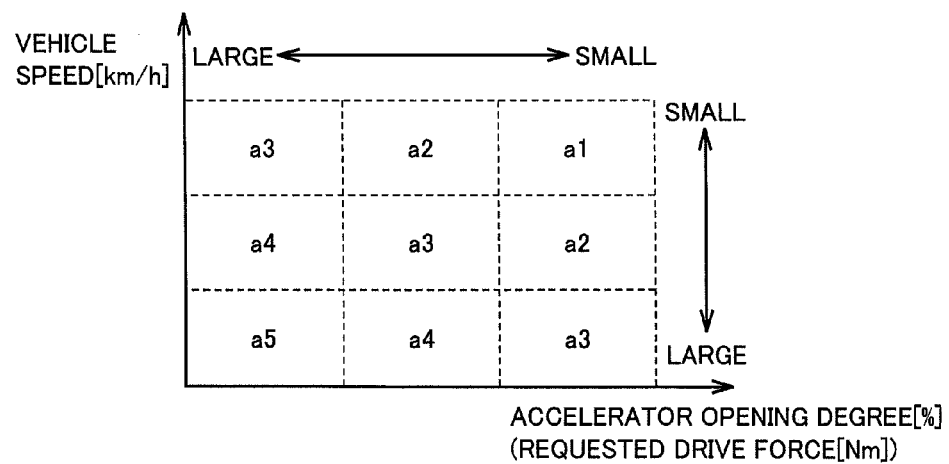
FIG. 6 is a conceptual diagram illustrating setting of a coefficient k2.

In order to reflect the traveling state of hybrid vehicle 5 during the limp-home mode traveling as described above in remaining travelable distance Dt1, traveling control unit 200 variably sets coefficient k2 in the above equation (3) in accordance with the vehicle speed and the accelerator opening degree during the limp-home mode traveling. FIG. 6 is a conceptual diagram illustrating setting of coefficient k2.

Referring to FIG. 6, coefficient k2 is set to have a value decreased with an increase in the accelerator opening degree [%]. Further, coefficient k2 is set to have a value decreased with an increase in the vehicle speed [km/h]. That is, coefficient k2 obtained when the accelerator opening degree is large and the vehicle speed is high has the smallest value, and coefficient k2 obtained when the accelerator opening degree is small and the vehicle speed is low has the largest value. With such a configuration, remaining travelable distance Dt1 in a case where hybrid vehicle 5 is caused to perform the limp-home mode traveling at an accelerated high vehicle speed is shorter than remaining travelable distance Dt1 in a case where hybrid vehicle 5 is caused to perform the limp-home mode traveling at a low vehicle speed.

Although coefficient k2 is set in accordance with the accelerator opening degree in FIG. 6, coefficient k2 may be set in accordance with the requested drive force [Nm] calculated based on the accelerator opening degree. In this case, coefficient k2 is set to have a value decreased with an increase in the requested drive force [Nm].

Traveling control unit 200 stores in advance the relation between the accelerator opening degree/vehicle speed and coefficient k2 shown in FIG. 6, as a map for calculating the remaining travelable distance. Then, when the limp-home mode traveling by motor generator MG2 is started, traveling control unit 200 sets corresponding coefficient k2 from the map, based on the monitored estimated SOC value (#SOC), vehicle speed V, and accelerator opening degree. Traveling control unit 200 calculates remaining travelable distance Dt1 at present by multiplying the estimated SOC value (#SOC) of power storage device 10 by set coefficient k2, and controls display unit 120 to display calculated remaining travelable distance Dt1.

Figure 7:
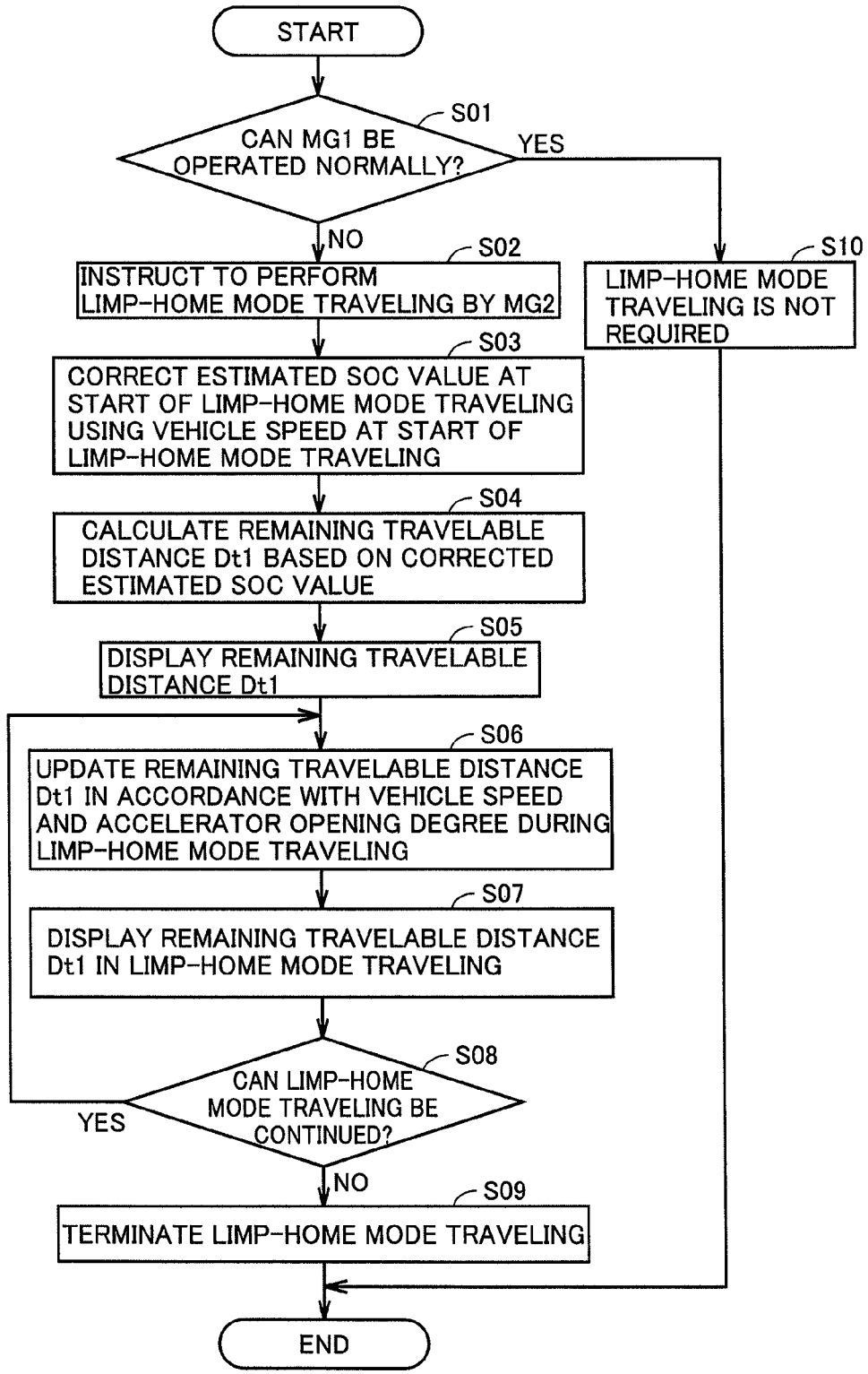
FIG. 7 is a flowchart illustrating limp-home mode traveling when a motor generator MG1 has an abnormality in the hybrid vehicle in accordance with Embodiment 1 of the present invention.

FIG. 7 is a flowchart illustrating the limp-home mode traveling when motor generator MG1 has an abnormality in the hybrid vehicle in accordance with Embodiment 1 of the present invention. The flowchart shown in FIG. 7 is executed as exemplary control processing programmed in control device 100 shown in FIGS. 1 and 4.

Referring to FIG. 7, in step S01, control device 100 serving as traveling control unit 200 determines whether or not motor generator MG1 can be operated normally. For example, when an abnormality occurs in first inverter 8-1 connected to motor generator MG1, motor generator MG1 cannot be operated. In addition, when a mechanical failure occurs in engine 18, a planetary gear mechanism in motive power split mechanism 22, or the like, motor generator MG1 cannot be operated normally even if first inverter 8-1 is normal.

If motor generator MG1 can be operated normally (YES in step S01), traveling control unit 200 terminates the control processing for the limp-home mode traveling without instructing to perform the limp-home mode traveling (step S10).

On the other hand, if motor generator MG1 cannot be operated normally (NO in step S01), traveling control unit 200 instructs in step S02 to perform the limp-home mode traveling by motor generator MG2. On this occasion, traveling control unit 200 generates an instruction to inhibit operation of first inverter 8-1. In response, all of the switching commands are turned OFF.

At the start of the limp-home mode traveling, traveling control unit 200 corrects the estimated SOC value (#SOC) from state estimation unit 110, using vehicle speed V at the start of the limp-home mode traveling. On this occasion, traveling control unit 200 increases the estimated SOC value (#SOC) at the start of the limp-home mode traveling, by remaining capacity ΔSOC in accordance with vehicle speed V at the start of the limp-home mode traveling, using the above equation (2).

Next, traveling control unit 200 calculates, in step S04, remaining travelable distance Dt1 in the limp-home mode traveling based on the corrected estimated SOC value (#SOC), using the above equation (3). Traveling control unit 200 sets calculated remaining travelable distance Dt1 as the initial value, and displays it on display unit 120.

When the limp-home mode traveling is started, traveling control unit 200 updates, in step S06, remaining travelable distance Dt1 in accordance with the traveling state (the estimated SOC value (#SOC) of power storage device 10, vehicle speed V, and the accelerator opening degree) of the vehicle during the limp-home mode traveling. Specifically, traveling control unit 200 sets coefficient k2 corresponding to vehicle speed V and the accelerator opening degree during the limp-home mode traveling, by referring to the map for calculating the remaining travelable distance shown in FIG. 6. Then, traveling control unit 200 calculates remaining travelable distance Dt1 at present based on set coefficient k2 and the estimated SOC value (#SOC) of power storage device 10 during the limp-home mode traveling, using the above equation (3). Subsequently, in step S07, traveling control unit 200 displays calculated remaining travelable distance Dt1 at present on display unit 120.

In step S08, traveling control unit 200 determines whether or not hybrid vehicle 5 can continue performing the limp-home mode traveling, based on the estimated SOC value (#SOC) of power storage device 10. If the estimated SOC value (#SOC) of power storage device 10 falls below the predetermined value, traveling control unit 200 determines that the limp-home mode traveling cannot be continued. In this case, in step S09, traveling control unit 200 stops operation of motor generator MG2 and thereby terminates the limp-home mode traveling of hybrid vehicle 5.

On the other hand, if the estimated SOC value (#SOC) of power storage device 10 is not less than the predetermined value, traveling control unit 200 determines that the limp-home mode traveling can be continued (YES in step S08), and continuously performs processing in steps S06, S07. In this manner, the limp-home mode traveling by motor generator MG2 is continued until the estimated SOC value (#SOC) of power storage device 10 falls below the predetermined value (NO in step S08).

As described above, according to Embodiment 1 of the present invention, the remaining travelable distance in the limp-home mode traveling using stored power in the power storage device is calculated based on the remaining capacity of the power storage device and the vehicle speed of the electrically-powered vehicle at the start of the limp-home mode traveling. Thereby, kinetic energy the electrically-powered vehicle has at the start of the limp-home mode traveling is reflected in the remaining travelable distance, and thus accuracy of calculating the remaining travelable distance can be improved.

In addition, the accuracy of calculating the remaining travelable distance can be further improved by updating the remaining travelable distance in accordance with the traveling state (the vehicle speed and the accelerator opening degree) of the electrically-powered vehicle during the limp-home mode traveling. As a result, the driver can make a driving plan based on the remaining travelable distance, and thus safety of the vehicle in the event of an abnormality can be ensured.

Embodiment 2

Embodiment 2 of the present invention will describe a configuration for notifying the driver of a remaining travelable distance in limp-home mode traveling using motive power generated by engine 18 in a case where the limp-home mode traveling is performed when motor generator MG2 has an abnormality.

If an abnormality occurs in motor generator MG2 or second inverter 8-2 connected to motor generator MG2, motor generator MG2 cannot be used, and thus traveling using motor generator MG2 as a motive power source cannot be performed. When motor generator MG2 has an abnormality as described above, hybrid vehicle 5 can stop operation of motor generator MG2, and perform the limp-home mode traveling using the motive power generated by engine 18.

Referring to FIG. 4 again, during the limp-home mode traveling, traveling control unit 200 generates an instruction to inhibit operation of motor generator MG2, and outputs it to distribution unit 250. Upon receiving the instruction to inhibit operation of motor generator MG2 via distribution unit 250, inverter control unit 260 generates switching command PWM2 such that each of switching elements constituting second inverter 8-2 stops switching operation (all of them are turned OFF).

Further, traveling control unit 200 generates an instruction to operate motor generator MG1 and outputs it to distribution unit 250 such that motor generator MG1 serves as a generator which can generate electric power by receiving the motive power generated by operating engine 18. Upon receiving the instruction to operate motor generator MG1 via distribution unit 250, inverter control unit 260 generates switching command PWM1 for converting AC power generated by motor generator MG1 using an output of engine 18 into DC power and supplying it to positive bus MPL and negative bus MNL.

In this manner, in the limp-home mode traveling, charging of power storage device 10 by motor generator MG1 is performed by motor generator MG1 performing the operation of generating electric power using the motive power of engine 18. On the other hand, supply of electric power from power storage device 10 to motor generator MG2 is not performed. Accordingly, the SOC of power storage device 10 is inevitably increased. As a result, when the SOC of power storage device 10 attains a predetermined fully-charged state, traveling control unit 200 stops operation of engine 18 and motor generator MG1 and terminates the limp-home mode traveling. That is, the remaining travelable distance in the limp-home mode traveling using only engine 18 is determined by allowable charging power, which is electric power allowed to charge power storage device 10 until power storage device 10 attains the predetermined fully-charged state. The allowable charging power depends largely on the SOC of power storage device 10. Therefore, also during the limp-home mode traveling using only engine 18, it is required to accurately calculate the remaining travelable distance and notify the driver of the calculated remaining travelable distance.

Hence, in hybrid vehicle 5 in accordance with Embodiment 2, if an abnormality occurs in motor generator MG2, traveling control unit 200 calculates a remaining travelable distance Dt2 in the limp-home mode traveling using only engine 18, based on the estimated SOC value (#SOC) from state estimation unit 110. Remaining travelable distance Dt2 indicates how much farther hybrid vehicle 5 can travel until the limp-home mode traveling is terminated by the estimated SOC value (#SOC) of power storage device 10 attaining the predetermined fully-charged state. Traveling control unit 200 displays, on display unit 120, calculated remaining travelable distance Dt2 together with information about the abnormality in motor generator MG2, and thereby notifies the driver of remaining travelable distance Dt2. Since the driver can thereby make a driving plan based on remaining travelable distance Dt2, safety of the vehicle in the event of an abnormality can be improved.

(Calculation of the Remaining Travelable Distance in the Limp-Home Mode Traveling)

Hereinafter, a technique for calculating remaining travelable distance Dt2 in the limp-home mode traveling using engine 18 in accordance with Embodiment 2 will be described with reference to the drawings.

During the limp-home mode traveling using engine 18, charging of power storage device 10 by motor generator MG1 is performed by motor generator MG1 performing the operation of generating electric power using the motive power of engine 18. Remaining travelable distance Dt2 can be calculated by multiplying a traveling distance per unit charging power for power storage device 10 [km/%] by the allowable charging power allowed until power storage device 10 attains the predetermined fully-charged state (for example, SOC=100%).

It is to be noted that the allowable charging power for power storage device 10 is indicated by a value obtained by subtracting the estimated SOC value (#SOC) from the predetermined fully-charged state (SOC=100%). Further, the traveling distance per unit charging power [km/%] can be determined beforehand assuming that, for example, hybrid vehicle 5 performs engine traveling in a traveling pattern having a minimum fuel consumption, which is a used fuel amount per unit traveling distance. The traveling distance per unit charging power is calculated by dividing the traveling distance in the engine traveling by electric power generated by motor generator MG1 using the motive power of the engine.

When the traveling distance per unit charging power [km/%] is defined as a coefficient h1 [km/%] for converting the SOC of power storage device 10 into a traveling distance, remaining travelable distance Dt2 in the limp-home mode traveling is calculated by substituting the estimated SOC value (#SOC) of power storage device 10 at the start of the limp-home mode traveling into the following equation (4):

$$Dt2 = h1 \cdot (100 - \#SOC) \tag{4}$$

Here, as described above, during traveling of the vehicle, hybrid vehicle 5 has kinetic energy in accordance with vehicle speed V ($= \frac{1}{2} mV^2$). Accordingly, in the case where the vehicle speed at the start of the limp-home mode traveling is high, it is expected that, even if the same amount of electric power is charged in power storage device 10, hybrid vehicle 5 can travel for a longer distance, when compared with the case where the vehicle speed is low. That is, even if the allowable charging power for power storage device 10 at the start of the limp-home mode traveling is the same, remaining travelable distance Dt2 differs depending on the vehicle speed at the start of the limp-home mode traveling. Thus, there may arise a deviation between remaining travelable distance Dt2 calculated by the above equation (4) and an actual remaining travelable distance.

Thus, in Embodiment 2, traveling control unit 200 calculates remaining travelable distance Dt2 in the limp-home mode traveling, based on the estimated SOC value (#SOC) of power storage device 10 and vehicle speed V at the start of the limp-home mode traveling. Specifically, traveling control unit 200 corrects the estimated SOC value (#SOC) at the start of the limp-home mode traveling, by subtracting remaining capacity ΔSOC in accordance with vehicle speed V at the start of the limp-home mode traveling from the estimated SOC value (#SOC) at the start of the limp-home mode traveling. That is, traveling control unit 200 decreases the estimated SOC value (#SOC) at the start of the limp-home mode traveling, by remaining capacity ΔSOC in accordance with vehicle speed V at the start of the limp-home mode traveling.

Here, correction amount ΔSOC for the estimated SOC value (#SOC) is calculated by multiplying vehicle speed V at the start of the limp-home mode traveling by a predetermined coefficient u [%/(km/h)]. Predetermined coefficient u is set, considering conversion efficiency when converting kinetic energy into electrical energy, and the like. As a result, the corrected estimated SOC value (#SOC) is represented by an equation (5):

$$\#SOC = \#SOC - u \cdot V \tag{5}$$

Traveling control unit 200 calculates remaining travelable distance Dt2 by substituting the corrected estimated SOC value (#SOC) into the above equation (4). Then, traveling control unit 200 controls display unit 120 to display calculated remaining travelable distance Dt2. Thereby, at the start of the limp-home mode traveling, the driver is notified of remaining travelable distance Dt2 calculated based on the corrected estimated SOC value (#SOC).

Further, traveling control unit 200 sets remaining travelable distance Dt2 at the start of the limp-home mode traveling as an initial value, and, while the limp-home mode traveling is performed, traveling control unit 200 updates remaining travelable distance Dt2 in accordance with the traveling state of hybrid vehicle 5.

Specifically, during the limp-home mode traveling, traveling control unit 200 monitors the estimated SOC value (#SOC) of power storage device 10, vehicle speed V, and the accelerator opening degree as the amount of depression of the accelerator pedal. Then, traveling control unit 200 calculates remaining travelable distance Dt2 at present based on the monitored estimated SOC value (#SOC), vehicle speed V, and accelerator opening degree.

Remaining travelable distance Dt2 at present is calculated by multiplying the estimated SOC value (#SOC) of power storage device 10 by a predetermined coefficient h2 [km/%]. Here, predetermined coefficient h2 is a coefficient for converting the allowable charging power for power storage device 10 during the limp-home mode traveling into a traveling distance. Using coefficient h2, remaining travelable distance Dt2 in the limp-home mode traveling is calculated by the following equation (6):

$$Dt2 = h2 \cdot (100 - \#SOC) \tag{6}$$

It is to be noted that #SOC in the equation (6) is the estimated SOC value (#SOC) corrected by the above equation (5). The corrected estimated SOC value (#SOC) is obtained by subtracting remaining capacity ΔSOC (=u·V) in accordance with vehicle speed V at the start of the limp-home mode traveling from the estimated SOC value (#SOC) given from state estimation unit 110 during the limp-home mode traveling.

Further, coefficient h2 in the equation (6) is variably set in accordance with vehicle speed V and the accelerator opening degree during the limp-home mode traveling. This is based on the finding that, when comparison is made between the case where hybrid vehicle 5 performs the limp-home mode traveling at a constant speed and the case where hybrid vehicle 5 performs the limp-home mode traveling while being accelerated, even if hybrid vehicle 5 travels the same distance, the output of engine 18 differs due to differences in the traveling resistance acting on the vehicle and the requested vehicle drive force. This is because electric power generated by motor generator MG1 (that is, charging power for power storage device 10) differs depending on the output of engine 18.

Referring for example to FIG. 5, in a case where hybrid vehicle 5 is caused to perform the limp-home mode traveling at driving point A (vehicle speed: V1), and then hybrid vehicle 5 is accelerated to shift to driving point B (vehicle speed: V2), engine 18 should generate more motive power, when compared with a case where hybrid vehicle 5 is caused to perform constant speed traveling at driving point B. When the motive power generated by engine 18 is increased, the electric power generated by motor generator MG1 is also increased, and thus the charging power for power storage device 10 is increased. Therefore, even if the estimated SOC value (#SOC) of power storage device 10 is the same, remaining travelable distance Dt2 is reduced because more electric power is charged in power storage device 10 by motor generator MG1.

In order to reflect the traveling state of hybrid vehicle 5 during the limp-home mode traveling as described above in remaining travelable distance Dt2, traveling control unit 200 variably sets coefficient h2 in the equation (6) in accordance with vehicle speed V and the accelerator opening degree during the limp-home mode traveling.

Figure 8:
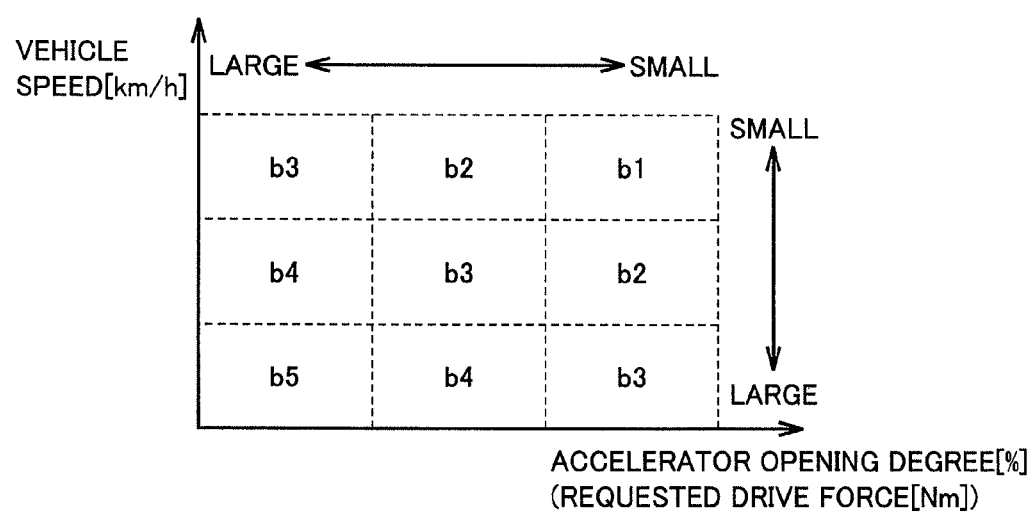
FIG. 8 is a conceptual diagram illustrating setting of a coefficient h2.

FIG. 8 is a conceptual diagram illustrating setting of coefficient h2.

Referring to FIG. 8, coefficient h2 is set to have a value decreased with an increase in the accelerator opening degree [%]. Further, coefficient h2 is set to have a value decreased with an increase in the vehicle speed [km/h]. That is, coefficient h2 obtained when the accelerator opening degree is large and the vehicle speed is high has the smallest value, and coefficient h2 obtained when the accelerator opening degree is small and the vehicle speed is low has the largest value. With such a configuration, remaining travelable distance Dt2 in the case where hybrid vehicle 5 is caused to perform the limp-home mode traveling at an accelerated high vehicle speed is shorter than remaining travelable distance Dt2 in the case where hybrid vehicle 5 is caused to perform the limp-home mode traveling at a low vehicle speed.

Although coefficient h2 is set in accordance with the accelerator opening degree in FIG. 8, coefficient h2 may be set in accordance with the requested drive force [Nm] calculated based on the accelerator opening degree. In this case, coefficient h2 is set to have a value decreased with an increase in the requested drive force [Nm].

Traveling control unit 200 stores in advance the relation between the accelerator opening degree/vehicle speed and coefficient h2 shown in FIG. 8, as a map for calculating the remaining travelable distance. Then, when the limp-home mode traveling by engine 18 is started, traveling control unit 200 sets corresponding coefficient h2 from the map, based on the monitored estimated SOC value (#SOC), vehicle speed V, and accelerator opening degree. Traveling control unit 200 calculates remaining travelable distance Dt2 at present by multiplying the allowable charging power (=100%−#SOC) for power storage device 10 by set coefficient h2, and controls display unit 120 to display calculated remaining travelable distance Dt2.

Figure 9:
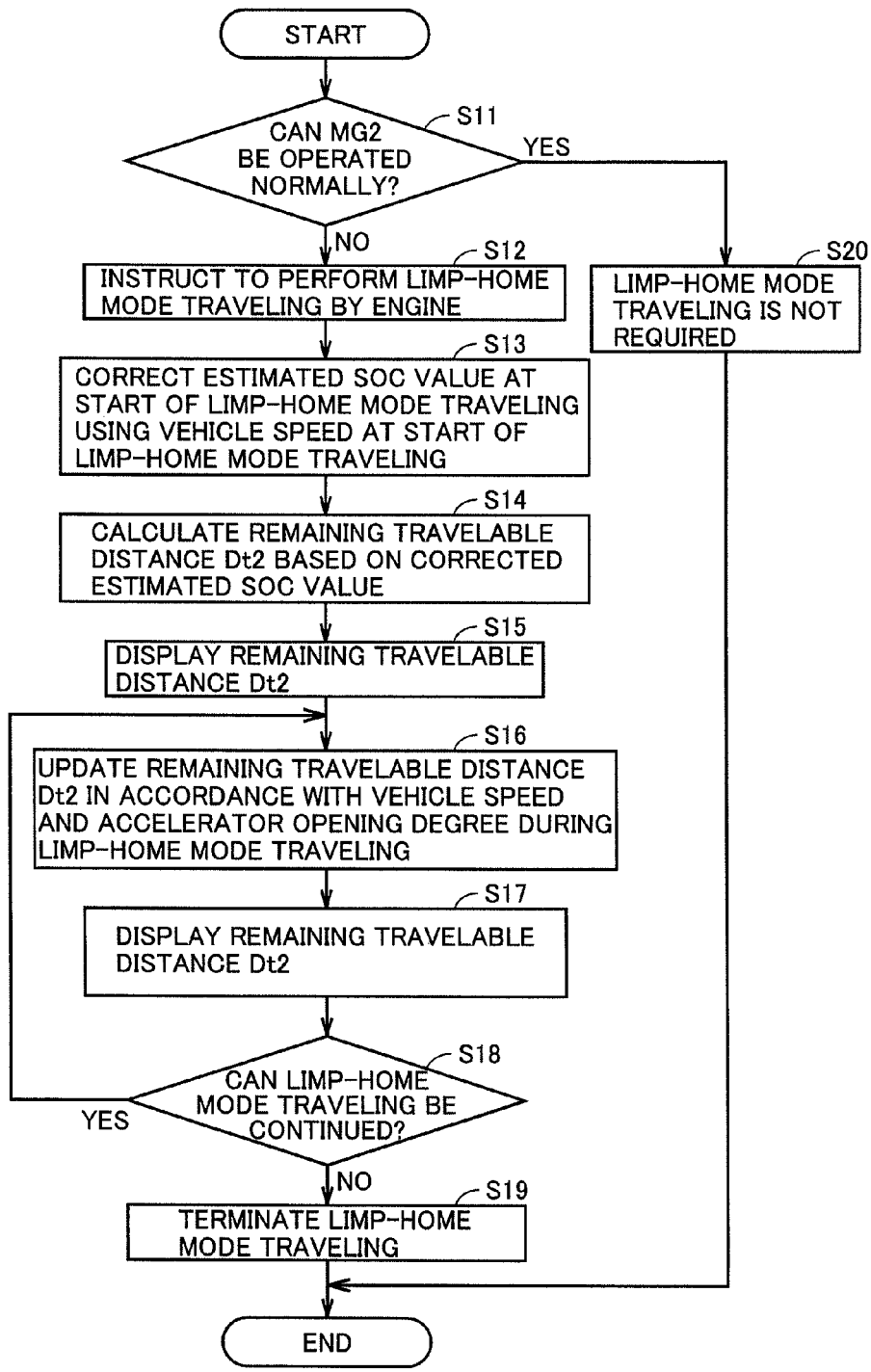
FIG. 9 is a flowchart illustrating limp-home mode traveling when a motor generator MG2 has an abnormality in a hybrid vehicle in accordance with Embodiment 2 of the present invention.

FIG. 9 is a flowchart illustrating the limp-home mode traveling when motor generator MG2 has an abnormality in the hybrid vehicle in accordance with Embodiment 2 of the present invention. The flowchart shown in FIG. 9 is executed as exemplary control processing programmed in control device 100 shown in FIGS. 1 and 4.

Referring to FIG. 9, in step S11, control device 100 serving as traveling control unit 200 determines whether or not motor generator MG2 can be operated normally. For example, when an abnormality occurs in second inverter 8-2 connected to motor generator MG2, motor generator MG2 cannot be operated.

If motor generator MG2 can be operated normally (YES in step S11), traveling control unit 200 terminates the control processing for the limp-home mode traveling without instructing to perform the limp-home mode traveling (step S20).

On the other hand, if motor generator MG2 cannot be operated normally (NO in step S11), traveling control unit 200 instructs in step S12 to perform the limp-home mode traveling by engine 18. On this occasion, traveling control unit 200 generates an instruction to inhibit operation of second inverter 8-2. In response, all of the switching commands are turned OFF.

At the start of the limp-home mode traveling, traveling control unit 200 corrects the estimated SOC value (#SOC) from state estimation unit 110, using the vehicle speed at the start of the limp-home mode traveling. On this occasion, traveling control unit 200 decreases the estimated SOC value (#SOC) at the start of the limp-home mode traveling, by remaining capacity ΔSOC in accordance with the vehicle speed at the start of the limp-home mode traveling, using the above equation (5).

Next, traveling control unit 200 calculates, in step S14, remaining travelable distance Dt2 in the limp-home mode traveling based on the corrected estimated SOC value (#SOC), using the above equation (4). In step S15, traveling control unit 200 sets calculated remaining travelable distance Dt2 as the initial value, and displays it on display unit 120.

When the limp-home mode traveling is started, traveling control unit 200 updates, in step S16, remaining travelable distance Dt2 in accordance with the traveling state (the estimated SOC value (#SOC) of power storage device 10, vehicle speed V, and the accelerator opening degree) of the vehicle during the limp-home mode traveling. Specifically, traveling control unit 200 sets coefficient h2 based on vehicle speed V and the accelerator opening degree during the limp-home mode traveling, by referring to the map for calculating the remaining travelable distance in FIG. 8. Then, traveling control unit 200 calculates remaining travelable distance Dt2 at present based on set coefficient h2 and the estimated SOC value (#SOC) of power storage device 10 during the limp-home mode traveling, using the above equation (6). Subsequently, in step S17, traveling control unit 200 displays calculated remaining travelable distance Dt2 at present on display unit 120.

In step S18, traveling control unit 200 determines whether or not hybrid vehicle 5 can continue performing the limp-home mode traveling, based on the estimated SOC value (#SOC) of power storage device 10. If the estimated SOC value (#SOC) of power storage device 10 attains the predetermined fully-charged state, traveling control unit 200 determines that the limp-home mode traveling cannot be continued. In step S19, traveling control unit 200 stops operation of engine 18 and motor generator MG1 and thereby terminates the limp-home mode traveling of hybrid vehicle 5.

On the other hand, if the estimated SOC value (#SOC) of power storage device 10 does not attain the predetermined fully-charged state, traveling control unit 200 determines that the limp-home mode traveling can be continued (YES in step S18), and continuously performs processing in steps S16, S17. In this manner, the limp-home mode traveling by engine 18 is continued until the estimated SOC value (#SOC) of power storage device 10 attains the predetermined fully-charged state (YES in step S18).

As described above, according to Embodiment 2 of the present invention, the remaining travelable distance in the limp-home mode traveling using the power generation mechanism for charging the power storage device during traveling of the vehicle is calculated based on the remaining capacity of the power storage device and the vehicle speed of the electrically-powered vehicle at the start of the limp-home mode traveling. Thereby, kinetic energy the electrically-powered vehicle has at the start of the limp-home mode traveling is reflected in the remaining travelable distance, and thus accuracy of calculating the remaining travelable distance can be improved. In addition, the accuracy of calculating the remaining travelable distance can be further improved by updating the remaining travelable distance in accordance with the traveling state (the vehicle speed and the accelerator opening degree) of the electrically-powered vehicle during the limp-home mode traveling. As a result, the driver can make a driving plan based on the remaining travelable distance, and thus safety of the vehicle in the event of an abnormality can be ensured.

It is noted that Embodiments 1 and 2 have described the configuration of the hybrid vehicle equipped with engine 18 and motor generator MG2 as drive force sources, as one example of the electrically-powered vehicle. In particular, Embodiment 1 has described the configuration for calculating the remaining travelable distance in the case where the limp-home mode traveling using the motive power generated by motor generator MG2 is performed in the hybrid vehicle having a hybrid configuration shown in FIG. 1. However, the present invention in accordance with Embodiment 1 is also applicable to the case of calculating a remaining travelable distance in EV (Electric Vehicle) traveling in which the vehicle is caused to travel using only the drive force of motor generator MG2. In addition, the present invention in accordance with Embodiment 1 is also applicable to a hybrid vehicle having a hybrid configuration different from that in FIG. 1 (for example, so-called parallel hybrid configuration) or an electric vehicle, as long as the vehicle is an electrically-powered vehicle capable of generating a vehicle drive force using only a motor.

Further, Embodiment 2 has described the configuration of the vehicle equipped with engine 18 as a drive force source and capable of generating the charging power for power storage device 10 using the output of engine 18, as one example of the electrically-powered vehicle. However, the present invention in accordance with Embodiment 2 is applicable to any vehicle as long as the vehicle is equipped with the power generation mechanism for charging power storage device 10 by power generation using the output of engine 18. Although Embodiment 2 has described, as an example, a series/parallel type hybrid vehicle in which the motive power of engine 18 can be split by motive power split mechanism 22 and transmitted to drive wheels 24F and motor generator MG1 as hybrid vehicle 5, the present invention is also applicable to other types of hybrid vehicles. The present invention is also applicable to, for example, a hybrid vehicle having a hybrid configuration different from that in FIG. 1 (for example, so-called series hybrid configuration, or electricity distribution type hybrid configuration), an electric vehicle, and a fuel cell vehicle.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

INDUSTRIAL APPLICABILITY

The present invention is applicable to an electrically-powered vehicle capable of generating a vehicle drive force using electric power from a vehicle-mounted power storage device.

REFERENCE SIGNS LIST

5: hybrid vehicle; 6: converter; 7: system main relay; 8: inverter; 10: power storage device; 11: monitoring unit; 12: temperature sensor; 13, 16: voltage sensor; 14: current sensor; 18: engine; 22: motive power split mechanism; 24F: drive wheel; 50: power control unit; 95: reduction mechanism; 100: control device; 110: state estimation unit; 120: display unit; 150: charging/discharging control unit; 200: traveling control unit; 202: sun gear; 204: pinion gear; 206: carrier; 208: ring gear; 250: distribution unit; 260: inverter control unit; 270: converter control unit; C: smoothing capacitor; MG1, MG2: motor generator; MNL: negative bus; MPL: positive bus; NL: negative line; PL: positive line.

The invention claimed is:

1. An electrically-powered vehicle comprising:
    a chargeable/dischargeable power storage device,
    a motor configured to generate a vehicle drive force by receiving supply of power from said power storage device; and
    a control unit controlling the vehicle drive force to be generated in response to a driver's request,
    said control unit including a calculation unit calculating a remaining travelable distance in first traveling using stored power in said power storage device, based on at least a remaining capacity of said power storage device and a vehicle speed, wherein
    during said first traveling, said motor is driven to output the requested vehicle drive force to said electrically-powered vehicle;
    wherein said calculation unit calculates the remaining travelable distance in said first traveling based on the remaining capacity of said power storage device and the vehicle speed at start of said first traveling, as an initial value, and updates the remaining travelable distance in said first traveling based on the remaining capacity of said power storage device, the vehicle speed, and the requested drive force during said first traveling; and
    wherein said calculation unit corrects the remaining capacity of said power storage device at the start of said first traveling, by adding a correction value based on the vehicle speed at the start of said first traveling, and calculates the initial value of the remaining travelable distance in said first traveling based on said corrected remaining capacity.

2. The electrically-powered vehicle according to claim 1, further comprising:
    an internal combustion engine as a drive force source; and
    a generator configured to generate charging power for said power storage device using an output of said internal combustion engine,
    wherein said control unit is configured such that, if said generator cannot be operated normally, said control unit causes said electrically-powered vehicle to perform limp-home mode traveling by said first traveling using only said motor, and
    during said limp-home mode traveling, said calculation unit calculates the remaining travelable distance in said first traveling, based on at least the remaining capacity of said power storage device and the vehicle speed.

3. An electrically-powered vehicle comprising:

a chargeable/dischargeable power storage device;

a motor configured to generate a vehicle drive force by receiving supply of power from said power storage device; and a control unit controlling the vehicle drive force to be generated in response to a driver's request, said control unit including a calculation unit calculating a remaining travelable distance in first traveling using stored power in said power storage device, based on at least a remaining capacity of said power storage device and a vehicle speed;

wherein during said first traveling, said motor is driven to output the requested vehicle drive force to said electrically-powered vehicle;

wherein said calculation unit calculates the remaining travelable distance in said first traveling based on the remaining capacity of said power storage device and the vehicle speed at start of said first traveling, as an initial value, and updates the remaining travelable distance in said first traveling based on the remaining capacity of said power storage device, the vehicle speed, and the requested drive force during said first traveling;

wherein said calculation unit converts the remaining capacity of said power storage device into the remaining travelable distance in said first traveling, using a first conversion coefficient, and said first conversion coefficient is set such that the remaining travelable distance with respect to the same remaining capacity of the power storage device has a value decreased with an increase in the vehicle speed or the requested drive force during said first traveling.

4. An electrically-powered vehicle comprising:

a chargeable/dischargeable power storage device;

a motor configured to generate a vehicle drive force by receiving supply of power from said power storage device;

a control unit controlling the vehicle drive force to be generated in response to a driver's request; an internal combustion engine as a drive force source; and a generator configured to generate charging power for said power storage device using an output of said internal combustion engine, said control unit including a calculation unit calculating a remaining travelable distance in first traveling using stored power in said power storage device, based on at least a remaining capacity of said power storage device and a vehicle speed, wherein during said first traveling, said motor is driven to output the requested vehicle drive force to said electrically-powered vehicle;

wherein said calculation unit calculates the remaining travelable distance in said first traveling based on the remaining capacity of said power storage device and the vehicle speed at start of said first traveling, as an initial value, and updates the remaining travelable distance in said first traveling based on the remaining capacity of said power storage device, the vehicle speed, and the requested drive force during said first traveling;

wherein said control unit is configured such that, if said motor cannot be operated normally, said control unit stops said motor and causes said electrically-powered vehicle to perform limp-home mode traveling by second traveling using only said internal combustion engine;

wherein during said second traveling, said internal combustion engine is driven to output the requested vehicle drive force to said electrically-powered vehicle;

wherein said calculation unit calculates a remaining travelable distance in said second traveling based on the remaining capacity of said power storage device and the vehicle speed at start of said second traveling, as an initial value, and updates the remaining travelable distance in said second traveling based on the remaining capacity of said power storage device, the vehicle speed, and said requested drive force during said second traveling; and wherein said calculation unit corrects the remaining capacity of said power storage device at the start of said second traveling, by subtracting the remaining capacity in accordance with the vehicle speed at the start of said second traveling, from the remaining capacity of said power storage device at the start of said second traveling, and calculates the initial value of the remaining travelable distance in said second traveling based on said corrected remaining capacity.

5. The electrically-powered vehicle according to claim 4, wherein said calculation unit converts allowable charging power for said power storage device calculated based on the remaining capacity of said power storage device during said second traveling into the remaining travelable distance in said second traveling, using a second conversion coefficient, and said second conversion coefficient is set such that said converted remaining travelable distance with respect to the same remaining capacity of the power storage device has a value decreased with an increase in the vehicle speed or the requested drive force during said second traveling.

* * * * *